(12) United States Patent
Zhou

(10) Patent No.: US 12,232,606 B2
(45) Date of Patent: Feb. 25, 2025

(54) RETRACTABLE BUILT-IN INTERDENTAL BRUSH

(71) Applicant: Xing Zhou, Guangzhou (CN)

(72) Inventor: Xing Zhou, Guangzhou (CN)

(*) Notice: Subject to any disclaimer, the term of this patent is extended or adjusted under 35 U.S.C. 154(b) by 369 days.

(21) Appl. No.: 17/573,494

(22) Filed: Jan. 11, 2022

(65) Prior Publication Data

US 2022/0133022 A1 May 5, 2022

Related U.S. Application Data

(63) Continuation of application No. PCT/CN2020/098481, filed on Jun. 28, 2020.

(30) Foreign Application Priority Data

Jul. 30, 2019 (CN) .......................... 201910697491.2

(51) Int. Cl.
*A46B 7/02* (2006.01)
*A46B 7/04* (2006.01)
*A61C 15/00* (2006.01)

(52) U.S. Cl.
CPC ................ *A46B 7/023* (2013.01); *A46B 7/04* (2013.01); *A61C 15/00* (2013.01); *A46B 2200/108* (2013.01)

(58) Field of Classification Search
CPC ... A61C 15/00; A46B 2200/108; A46B 7/023; A46B 7/04
See application file for complete search history.

(56) References Cited

U.S. PATENT DOCUMENTS

| 5,095,580 A * | 3/1992 | Capponi ................ A46B 7/023 |
| | | 132/320 |
| 2004/0197735 A1* | 10/2004 | Lesage ................... A61C 15/00 |
| | | 433/141 |

(Continued)

FOREIGN PATENT DOCUMENTS

| CA | 2638068 A1 * | 1/2009 | ............. A46B 13/02 |
| CN | 203801948 U * | 9/2014 | |

(Continued)

OTHER PUBLICATIONS

CN-203801948-U—English Machine Translation (Year: 2014).*

(Continued)

*Primary Examiner* — Marc Carlson
(74) *Attorney, Agent, or Firm* — Morgan, Lewis & Bockius LLP (57) ABSTRACT

A retractable built-in interdental brush includes a built-in interdental brush, a retractable mechanism, and a handle. The built-in interdental brush is connected to the retractable mechanism. By driving the retractable mechanism, the built-in interdental brush can be driven to extend from the handle to clean a gap between teeth. After use, the built-in interdental brush retracts into an accommodation space of the handle through the retractable mechanism, so that the handle can form a compact instrument box, which is very convenient to carry. An end surface of a delivery device of the built-in interdental brush is an inclined surface and is at an angle β to an axial direction of the retractable built-in interdental brush is, where the angle β is less than 90°.

10 Claims, 10 Drawing Sheets

(56) References Cited

U.S. PATENT DOCUMENTS

| | | | |
|---|---|---|---|
| 2015/0114418 A1* | 4/2015 | Zmiyiwsky | A61C 15/02 132/200 |
| 2016/0038262 A1* | 2/2016 | Zmiyiwsky | A61C 15/02 132/328 |
| 2020/0229908 A1* | 7/2020 | Zhou | A61C 15/00 |

FOREIGN PATENT DOCUMENTS

| | | | | |
|---|---|---|---|---|
| CN | 107456289 A | | 12/2017 | |
| KR | 20100029487 A | | 3/2010 | |
| KR | 20120102398 A | * | 9/2012 | |
| KR | 20180047898 A | * | 5/2018 | |
| WO | WO03011073 A1 | | 2/2003 | |
| WO | WO-2016070294 A1 | * | 5/2016 | A46B 13/02 |

OTHER PUBLICATIONS

Zhou, Xing, International Search Report, PCT/CN2020/098481, Sep. 18, 2020, 4 pgs.

Zhou, Xing, International Preliminary Report on Patentability and Written Opinion, PCT/CN2020/098481, Sep. 17, 2020, 9 pgs.

Zhou, Xing, European Search Report, EP20846750.6, Jun. 6, 2023, 9 pages.

Zhou, Xing, Communication Pursuant to Rules 70(2) and 70a(2) EPC, EP20846750.6, Jul. 18, 2023, 1 pg.

* cited by examiner

RETRACTABLE BUILT-IN INTERDENTAL BRUSH

CROSS-REFERENCE TO RELATED APPLICATIONS

This application is a continuation application of PCT Patent Application No. PCT/CN2020/098481, entitled "RETRACTABLE BUILT-IN INTERDENTAL BRUSH" filed on Jun. 28, 2020, which claims priority to Chinese Patent Application No. 201910697491.2, entitled "RE TRACTABLE BUILT-IN INTERDENTAL BRUSH" and filed with the China National Intellectual Property Administration on Jul. 30, 2019, both of which are incorporated herein by reference in their entirety.

TECHNICAL FIELD

The present application relates to a tool for oral cavity cleaning, and in particular, to a built-in interdental brush for cleaning a gap between teeth.

BACKGROUND

Due to reasons such as aging, pathology, and the like, gingival atrophy is easily caused, and a gap between teeth is easily expanded, thereby causing food residues. If the residues are not cleaned in time, not only oral odor may be generated, but also various dental diseases, oral diseases, and especially periodontitis are easily caused.

In view of this situation, various interdental brushes (or referred to as interdental brushes) have been developed on the market for users to choose. Although there are various products with different structures and specifications on the market, the existing products are generally difficult to be aligned with a gap between teeth and observe the gap between teeth. Moreover, the product is inconvenient to carry when the user goes out, and it is inconvenient to store after use. Especially, when a gap between a third molar and a second molar, or a gap between the second molar and a first molar, or a gap between the first molar and the second molar is cleaned, because a position of the gap between the teeth to be cleaned is located deep in an oral cavity, a brush body of the interdental brush in the prior art usually adopts a brush structure in which a metal wire is attached to a fiber made of a high polymer material. Therefore, the metal wire easily stabs gingival tissue during operation by feeling.

Due to the disadvantage that the interdental brush is difficult to enter the gap between teeth, easily stabs the gums, and is inconvenient to carry and use during cleaning the gap between the molars by the interdental brush of the prior art, the applicant has applied for "Retractable Interdental Brush" (application No.: 201811648006.4), to improve the existing interdental brush. This application is a further improvement to the delivery device of the above patent.

SUMMARY

The retractable built-in interdental brush of the present application has a special inclined surface design on the end surface of the delivery device, and the inclined surface can better position the gap between the teeth during use. When the interdental brush is pushed and pulled, the inclined surface can be well embedded in the gap between the teeth and is not easy to slip off, and the positioning is more convenient and stable.

The retractable built-in interdental brush of the present application is provided. A retractable built-in interdental brush 900 includes a built-in interdental brush 101, a retractable mechanism 200, and a handle 300. The handle 300 includes an accommodation space 31. The built-in interdental brush 101 extends from or retracts into the accommodation space 31 of the handle 300 through the retractable mechanism 200. An end surface 12-11 of a delivery device 12 of the built-in interdental brush 101 is an inclined surface and is at an angle β to an axial direction of the retractable built-in interdental brush 900.

The retractable built-in interdental brush of the present application can clean a gap between teeth when the built-in interdental brush 101 is pushed out of the handle 300 through the retractable mechanism 200. When the retractable mechanism 200 is used to retract the built-in interdental brush 101 into the accommodation space 31 of the handle 300, the handle 300 may form a compact instrument box, which is very convenient to carry.

The inclined surface design of the end surface 12-11 of the delivery device 12 can better position the gap between the teeth. When the interdental brush is pushed and pulled, the end surface 12-11 with the inclined surface design can be well embedded in the gap between the teeth and is not easy to slip off, and the positioning is more convenient and stable. An outlet of an elbow 12-1 at a front end of the delivery device 12 is pushed against the gap between teeth to be cleaned to push a brush body 11, and a working portion 11-1 of the brush body 11 extends from the elbow 12-1 and enters the gap between teeth, thereby resolving a problem well that the existing interdental brush easily stabs gingival tissues due to a difficulty of alignment to the gap between teeth.

Further, the angle β is less than 90°.

A preferred range of the angle β is 5° to 50°. The angle β is an acute angle less than 90°, especially an acute angle between 5° and 50°. In this way, an acute taper can be formed on an upper part of the end surface 12-11, and a position of a tip can just be embedded in the gap between the teeth. In addition, due to the acute angle, a lower part will not block the movement of the brush body 11, and the use process is very convenient.

The built-in interdental brush 101 includes a brush body 11 and the delivery device 12. The brush body 11 is movably built in the elbow 12-1 at the front end of the delivery device 12. The end surface 12-11 is located at an outlet end of the elbow 12-1. A working portion 11-1 of the brush body 11 may extend from or retract into the elbow 12-1 under the action of external force. During use, the brush body 11 may be first retracted into the elbow 12-1 at the front end of the delivery device 12, the outlet of the elbow 12-1 at the front end of the delivery device 12 is pushed against the gap between teeth to be cleaned to push the brush body 11, and the working portion 11-1 of the brush body 11 extends from the elbow 12-1 and enters the gap between teeth, thereby resolving a problem well that the existing interdental brush easily stabs gingival tissues due to a difficulty of alignment to the gap between teeth.

The brush body 11 is made of an elastic material. The elastic material is selected from an elastic polymer material or an elastic metal material. The brush body 11 can be mounted in the elbow 12-1 after being elastically deformed. When the brush body 11 extends from the elbow 12-1, the brush body 11 can be restored to the original shape again.

The brush body 11 may be linear. When the brush body 11 extends from the elbow 12-1, the brush body 11 can be restored or basically restored to the linear shape again. The brush body 11 may also be an arc-shaped brush body. When the brush body 11 extends from the elbow 12-1, the brush body 11 has an arc shape similar to that of an outer contour of the tooth.

In actual application, a fiber or a protrusion 11-11 of the working portion 11-1 of the brush body 11 may be made of the elastic polymer material, while a connecting body 11-2 of the brush body 11 is made of the elastic metal material. In the process of injection molding in a metal mold, the connecting body 11-2 made of the elastic metal material and the fiber or the protrusion 11-11 made of the elastic polymer material are formed into a whole to form the brush body 11. In this way, the built-in interdental brush with a composite structure not only ensures the flexibility of the working portion 11-1 of the brush body 11, but also maintains overall elasticity and moderate rigidity of the brush body 11, and has good transitivity of force.

The brush body 11 may also be made of a shapeable material, and may be shaped to a certain extent in advance according to the external contour of teeth. When the brush body 11 extends from the elbow 12-1, the preset shape may be basically maintained.

The retractable mechanism 200 is a slide-type retractable mechanism or a rotation-type retractable mechanism. The retractable mechanism 200 may be a slide-type retractable mechanism, and the built-in interdental brush 101 is pushed from or retracted into the handle 300 through sliding. The retractable mechanism 200 may also be a rotation-type retractable mechanism. For example, the built-in interdental brush 101 is pushed from or retracted into the handle 300 by rotating the retractable mechanism 200 by using the movement mode of a threaded screw. Definitely, those skilled in the art may also design the retractable mechanism 200 with different structures as required without departing from the protection scope of this application.

The retractable mechanism 200 is a slide-type retractable mechanism. The slide-type retractable mechanism includes a sliding groove 21 and a sliding block 22, The sliding block 22 is pushed to reciprocate along the sliding groove 21, so that the built-in interdental brush 101 extends from or retracts into the handle 300. The sliding groove 21 may be disposed on a housing 32 of the handle 300, and the sliding block 22 is connected to a connecting portion 13 of the built-in interdental brush 101 through a connecting end 22-1, so that the built-in interdental brush 101 and the retractable mechanism 200 can be connected as a whole. During use, the sliding block 22 is pushed up and down to move up and down along the sliding groove 21. When the sliding block 22 moves upward, the sliding block 22 drives the built-in interdental brush 101 to move upward, and the built-in interdental brush 101 extends from the handle 300 to clean the gap between teeth. Upon completion of the cleaning, the sliding block 22 is pushed downward to drive the built-in interdental brush 101 to move downward, and the built-in interdental brush 101 is retracted into the accommodation space 31 of the handle 300.

The built-in interdental brush 101 is detachably mounted on the retractable mechanism 200. The built-in interdental brush 101 is detachably mounted on the retractable mechanism 200, so that the built-in interdental brush 101 can be replaced when needed, and the use process is cleaner and sanitary.

The built-in interdental brush 101 is connected to the retractable mechanism 200 through concave-convex snap fit connection, threaded connection, or interference fit connection. The applicant herein only lists the foregoing detachable connection manners. Those skilled in the art may design different detachable connection manners as required without departing from the protection scope of this application.

The built-in interdental brush 101 is non-detachably mounted on the retractable mechanism 200. The built-in interdental brush 101 may also be non-detachably mounted on the retractable mechanism 200, which can effectively prevent the built-in interdental brush 101 from falling off during use. Especially when the built-in interdental brush 101 is a built-in interdental brush 101, the delivery device 12 may be fixedly mounted on the retractable mechanism 200 through the connecting portion 13, and only the brush body 11 needs to be replaced after cleaning. In this way, the requirement of regular tool replacement and a sanitary requirement for convenience of cleaning is satisfied, and the built-in interdental brush 101 can also be prevented from falling off the retractable mechanism 200 during the cleaning. Therefore, the use process is safer.

The built-in interdental brush 101 is connected to the retractable mechanism 200 through bonding or integral manufacturing. The built-in interdental brush 101 is fixedly connected to the retractable mechanism 200 in various manners such as bonding, integral manufacturing, ultrasonic welding, and the like.

During assembling, a bottom cover 33 of the handle 300 is first removed, the built-in interdental brush 101 is connected to the retractable mechanism 200, the built-in interdental brush 101 and the retractable mechanism 200 are both placed into the accommodation space 31 from the bottom of the handle 300, the sliding block 22 of the retractable mechanism 200 is mounted in the sliding groove 21, and the bottom cover 33 is mounted.

During use, the sliding block 22 is pushed upward to push the built-in interdental brush 101 out of the handle 300. If the built-in interdental brush 101 is a built-in interdental brush 101, after the built-in interdental brush 101 is pushed out of the handle 300, the brush body 11 may be first retracted into the elbow 12-1 at the front end of the delivery device 12, the end surface 12-11 of the elbow 12-1 at the front end of the delivery device 12 is pushed against the gap between teeth to be cleaned to push the brush body 11, and the working portion 11-1 of the brush body 11 extends from the elbow 12-1 and enters the gap between teeth, so that the gap between teeth can be cleaned.

The retractable built-in interdental brush of the present application includes a built-in interdental brush 101, a retractable mechanism 200, and a handle 300. The built-in interdental brush 101 is connected to the retractable mechanism 200. By driving the retractable mechanism 200, the built-in interdental brush 101 can be driven to extend from the handle 300. The end surface 12-11 of the delivery device 12 of the built-in interdental brush 101 is an inclined surface and is at an angle β to an axial direction of the retractable built-in interdental brush 900. The angle β is less than 90°. An acute taper is formed on an upper part of the end surface 12-11. A position of a tip can just be embedded in the gap between the teeth. The brush body 11 is pushed, so that the working portion 11-1 of the brush body 11 extends from the elbow 12-1 and enters the gap between the teeth. Therefore, the problem that the existing built-in interdental brush is difficult to align to the teeth and easily stabs gingival tissues is effectively resolved. In addition, by means of the tapered structure, slip-off is less likely to occur, and the positioning is more convenient and stable.

BRIEF DESCRIPTION OF THE DRAWINGS

FIG. 1-1 is a front view of FIG. 1.

FIG. 1-2 is a cross-sectional view of FIG. 1.

FIG. 2-1 is a cross-sectional view of FIG. 2.

FIG. 3-1 is a front view of FIG. 3.

FIG. 3-2 is a cross-sectional view of FIG. 3.

In the foregoing figure:

101 represents a built-in interdental brush, 200 represents a retractable mechanism, and 300 represents a handle.

11 represents a brush body, 12 represents a delivery device, and 13 represents a connecting portion; 11-1 represents a working portion, 11-2 represents a connecting body, and 12-1 represents an elbow; 12-2 represents an axial axis of the delivery device 12, 11-11 represents a fiber or a protrusion, and 12-11 represents an end surface.

21 represents a sliding groove, 22 represents a sliding block, 21-1 represents a locking block, 21-2 represents a limiting block, and 22-1 represents a connecting end.

31 represents an accommodation space, 32 represents a housing, and 33 represents a bottom cover.

DESCRIPTION OF EMBODIMENTS

Embodiment: Retractable built-in interdental brush of the present application Referring to FIG. 1 to FIG. 4, a retractable built-in interdental brush of the present application includes a built-in interdental brush 101, a retractable mechanism 200, and a handle 300.

Figure 1:
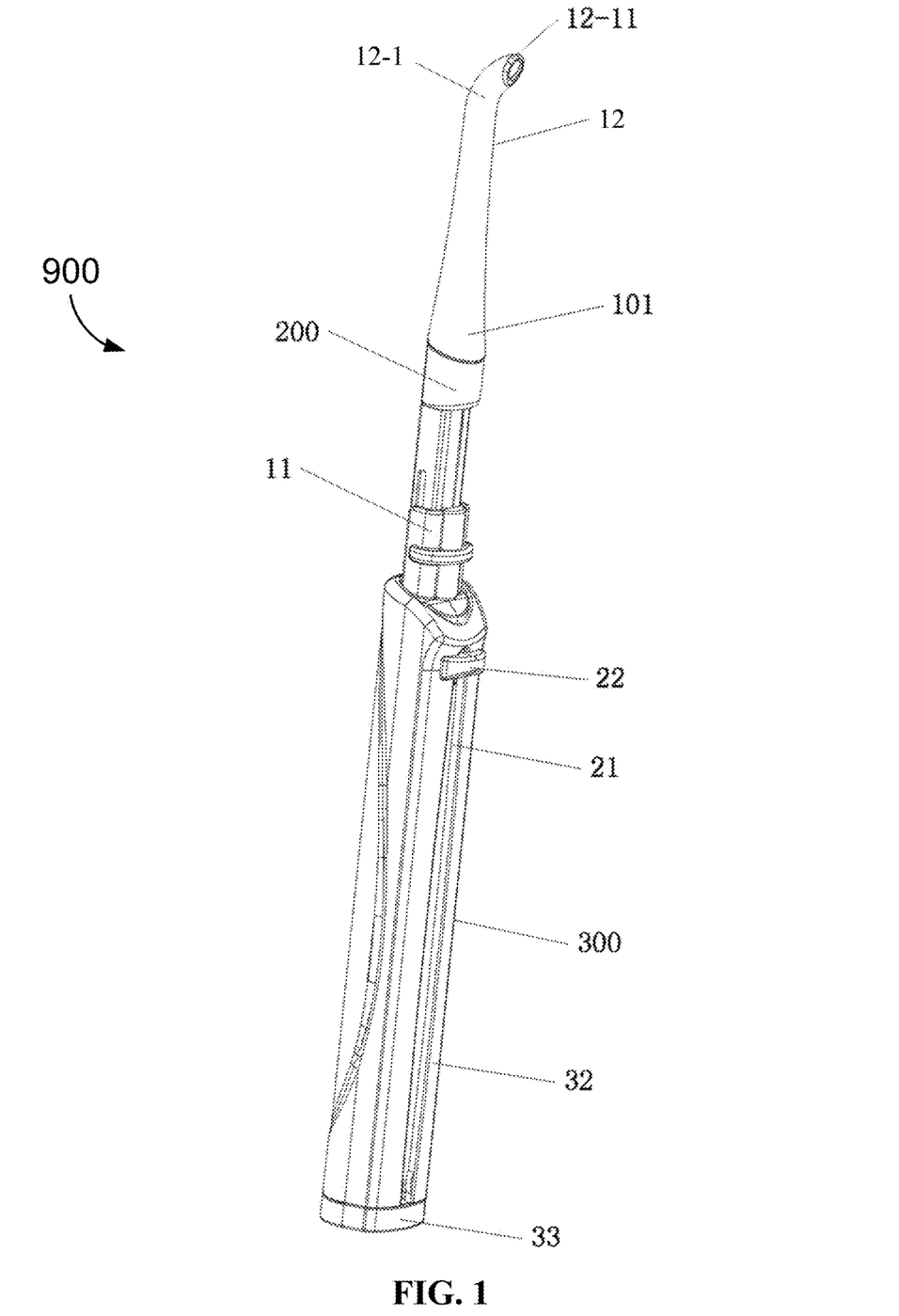
FIG. 1 is a three-dimensional schematic structural diagram of a built-in interdental brush of a retractable built-in interdental brush extending from a handle according to the present application.
Figure 4:
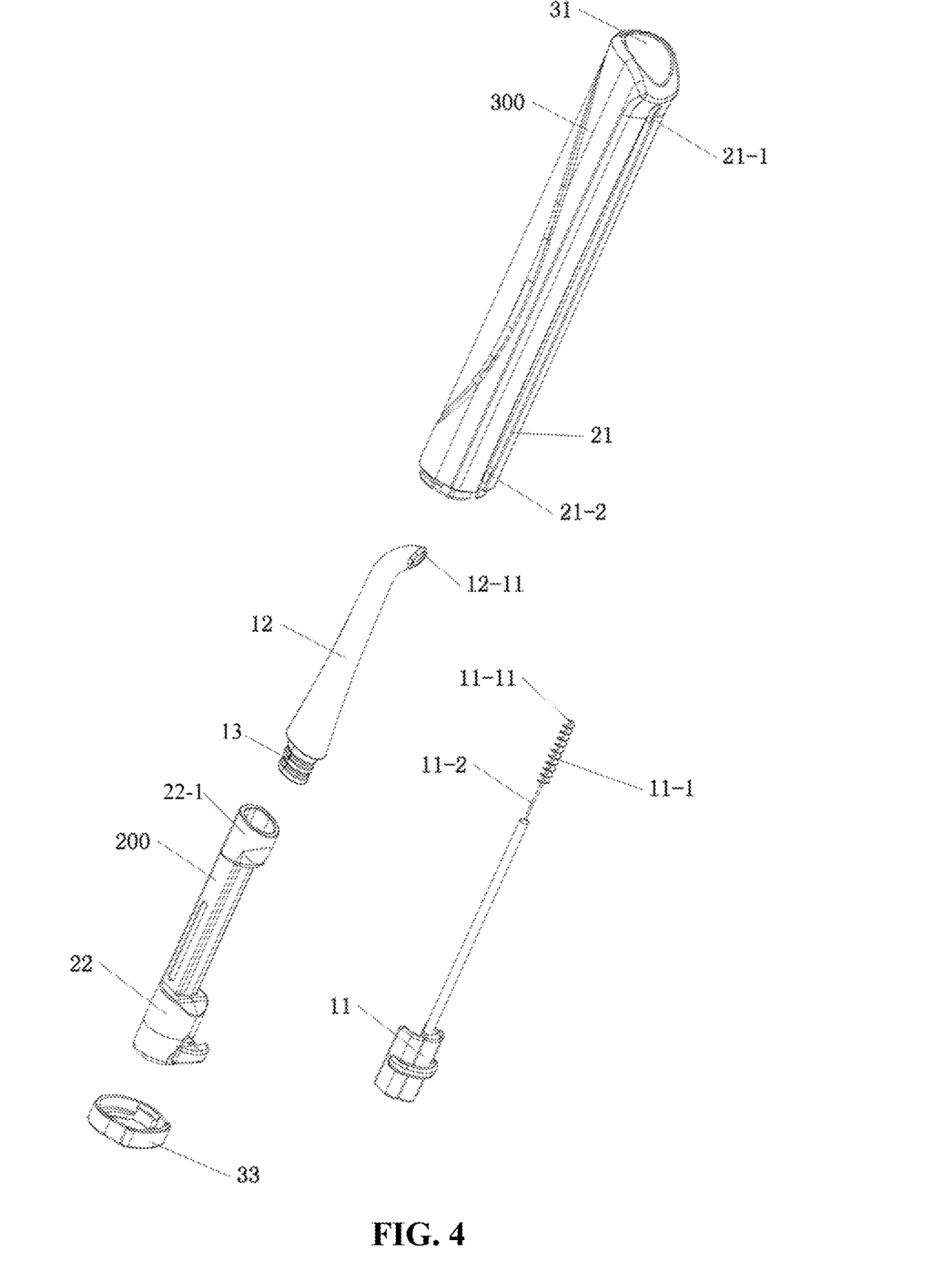
FIG. 4 is an exploded view of FIG. 1.
Figure 12:
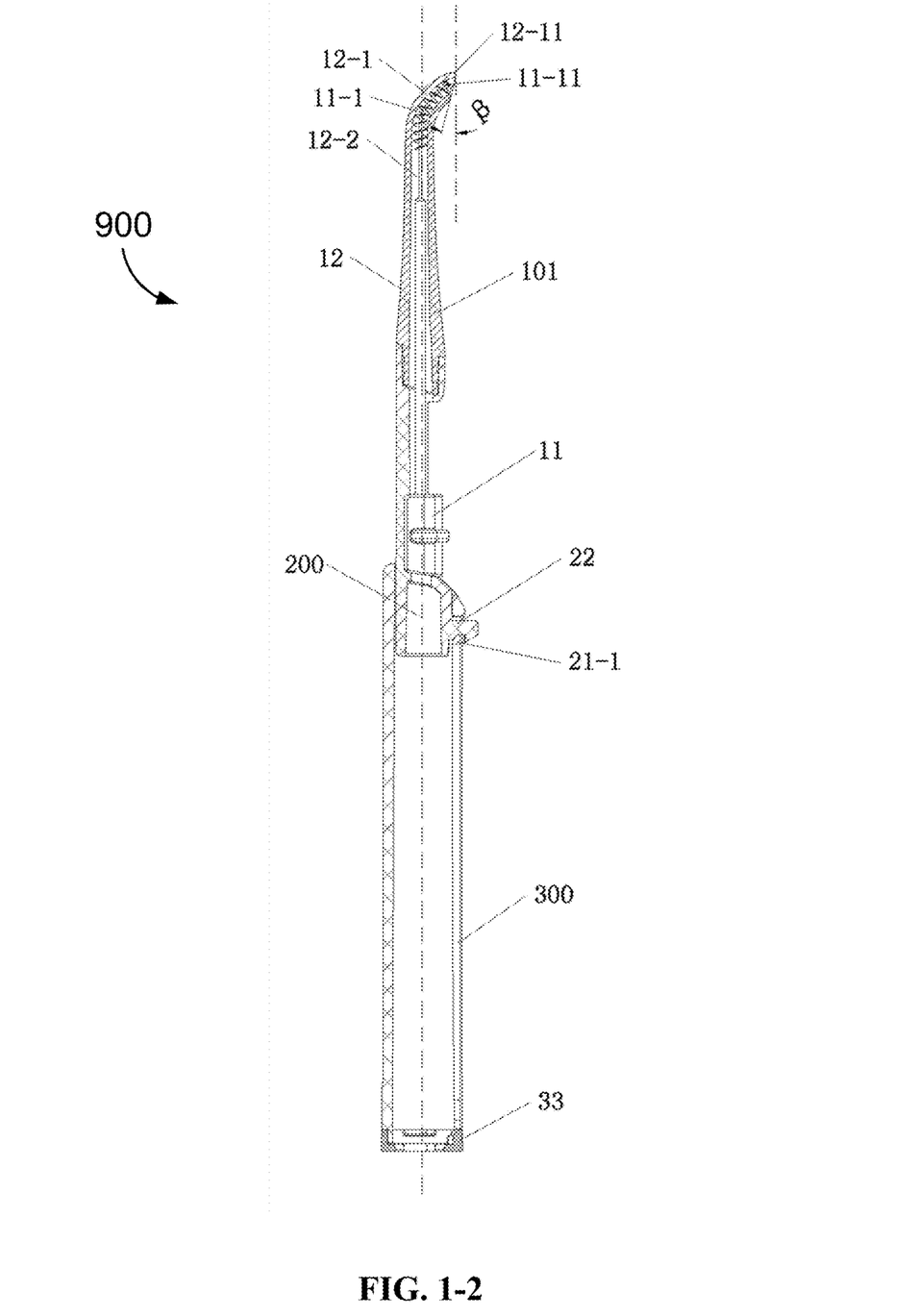
Figure 21:
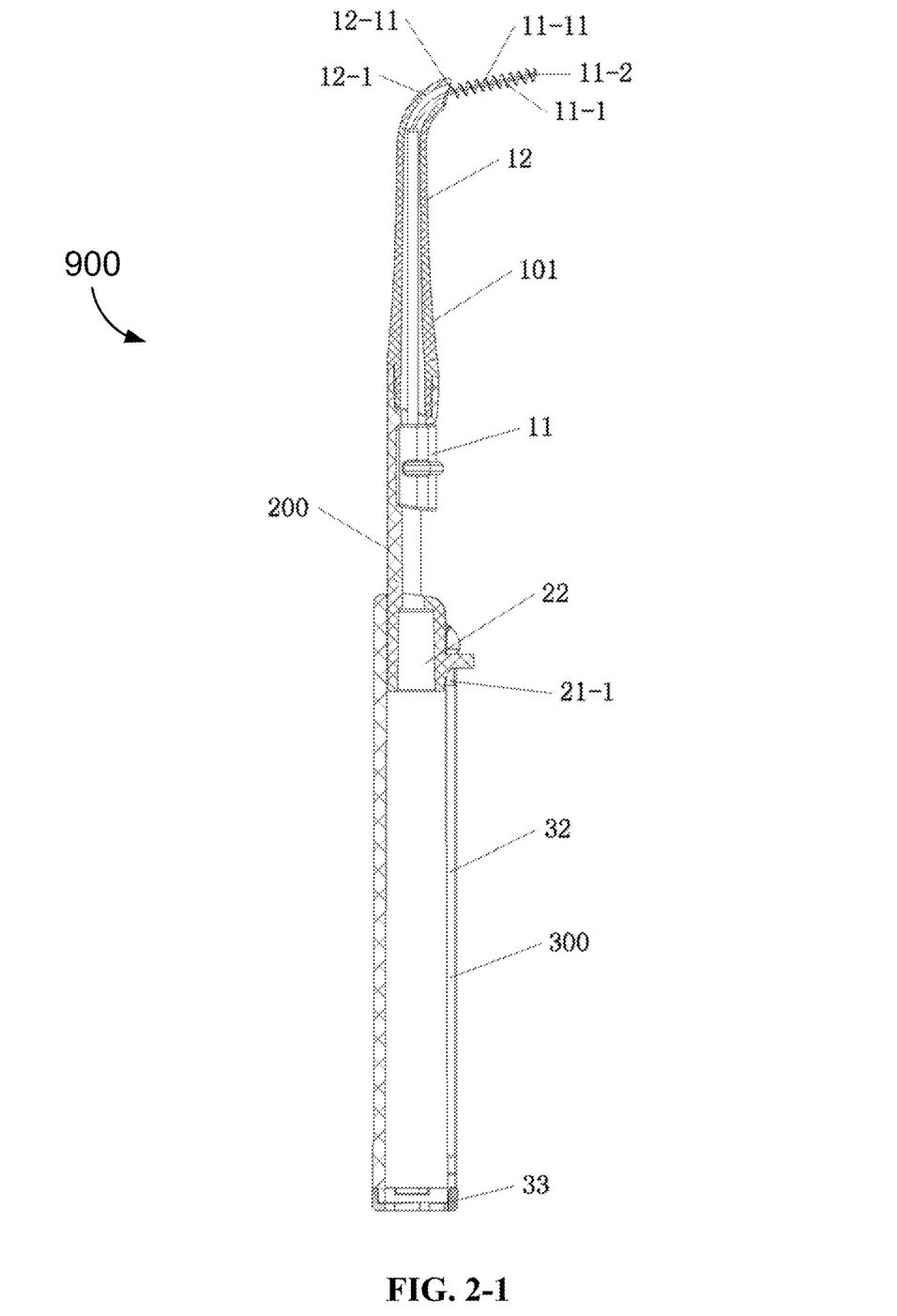
Figure 31:
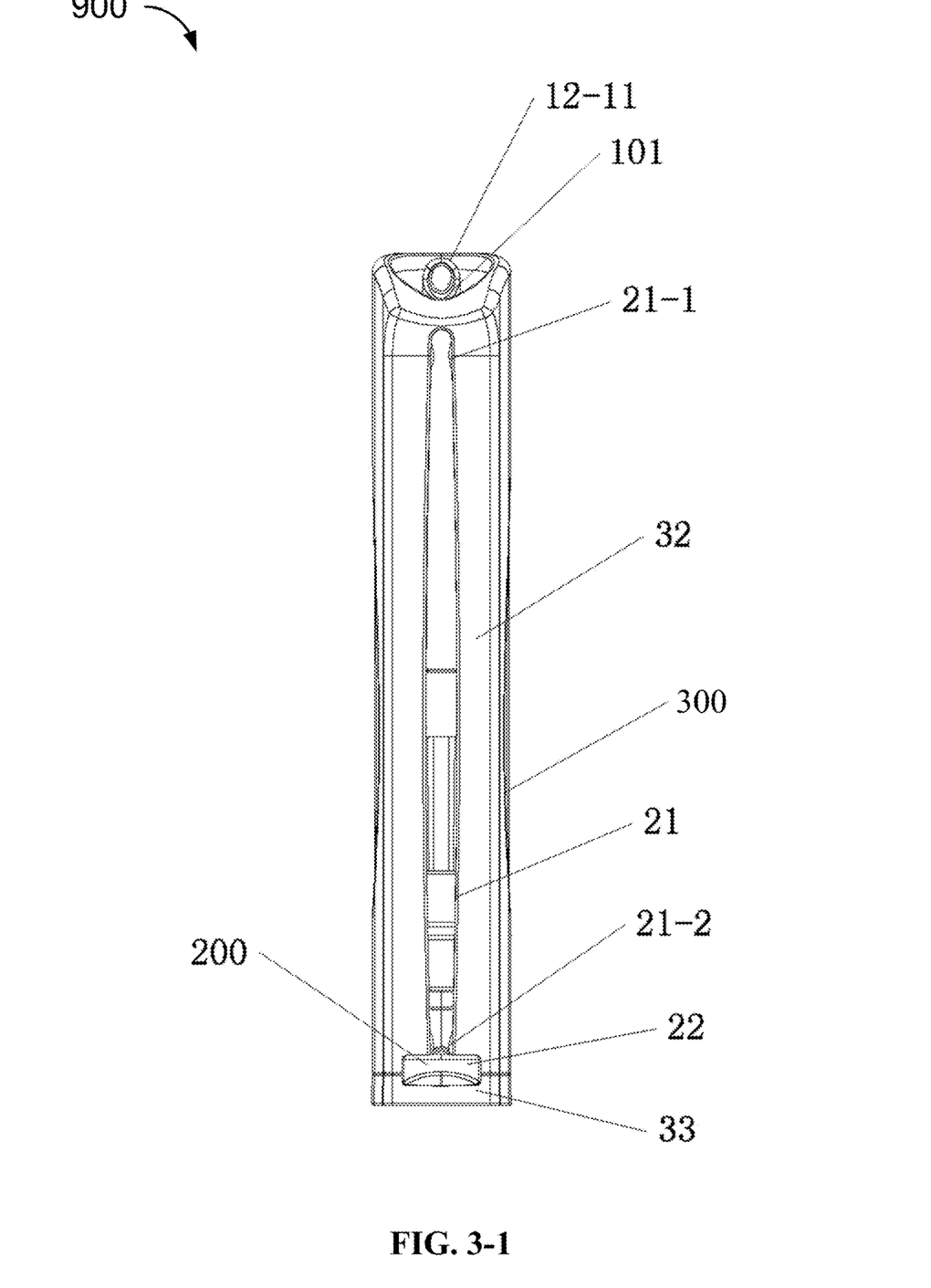

The built-in interdental brush 101 includes a brush body 11 and a delivery device 12, the brush body 11 being movably built in an elbow 12-1 at a front end of the delivery device 12. A working portion 11-1 of the brush body 11 may extend from or retract into the elbow 12-1 under the action of external force.

Referring to FIG. 1 and FIG. 1-2, an end surface 12-11 of a delivery device 12 of the built-in interdental brush 101 is an inclined surface and is at an angle β to an axial direction of the retractable built-in interdental brush 900.

In the present embodiment, the angle β is less than 90°.

Generally, the angle β ranges from 5° to 50°. The angle β is an acute angle less than 90°, especially an acute angle between 5° and 50°. In this way, an acute taper can be formed on an upper part of the end surface 12-11, and a position of a tip can just be embedded in the gap between the teeth. In addition, due to the acute angle, a lower part will not block the movement of the brush body 11, and the use process is very convenient.

Figure 2:
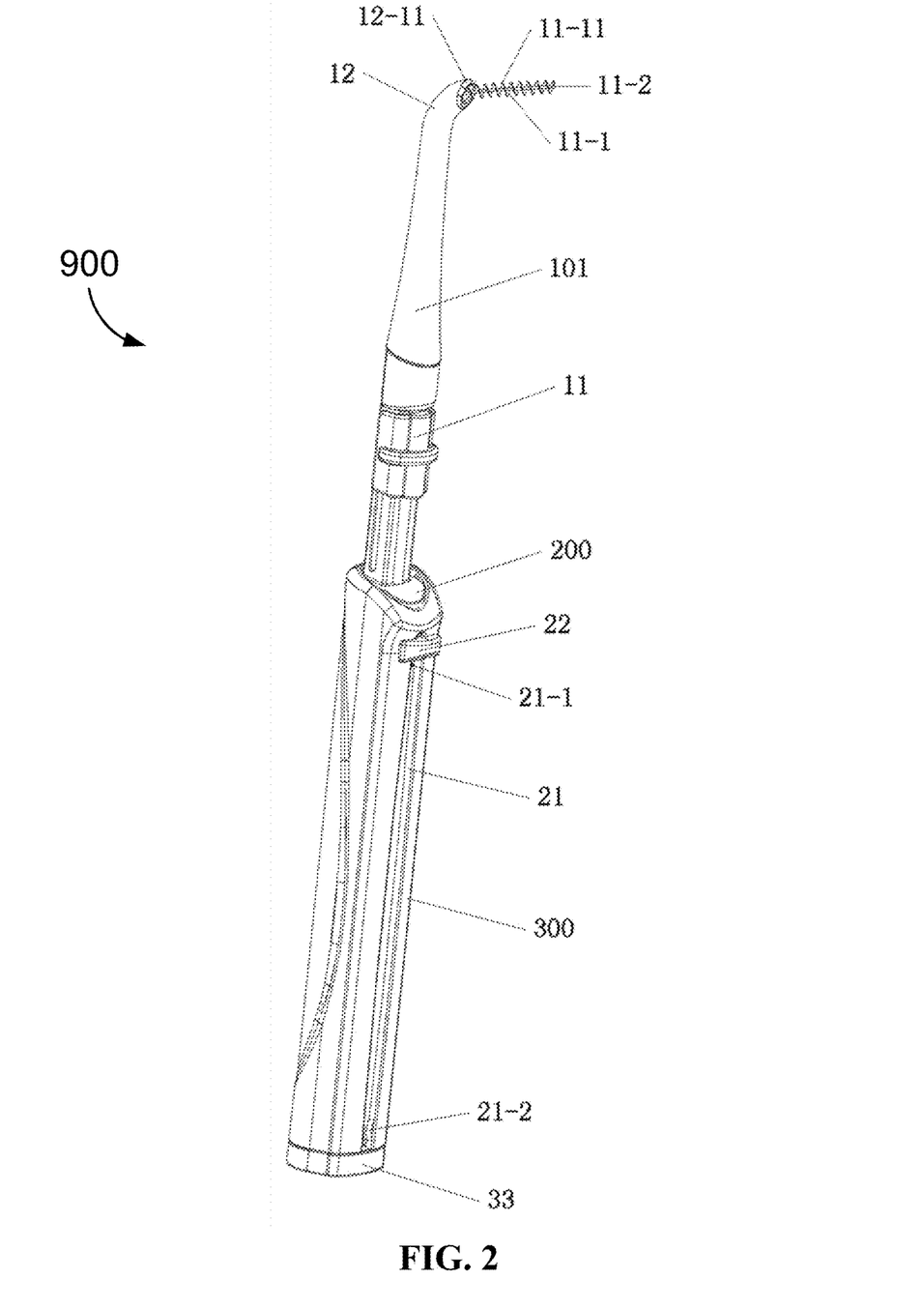
FIG. 2 is a three-dimensional schematic structural diagram of a brush body of FIG. 1 extending from an elbow of a delivery device.

Referring to FIG. 2 and FIG. 4, in the present embodiment, the brush body 11 is linear and made of an elastic material. The brush body 11 can be mounted in the elbow 12-1 after being elastically deformed. When the brush body 11 extends from the elbow 12-1, the brush body 11 can be restored or basically restored to the linear shape again.

The elastic material is selected from an elastic polymer material or an elastic metal material. For example, a fiber or a protrusion 11-11 of the working portion 11-1 of the brush body 11 is made of the elastic polymer material, while a connecting body 11-2 of the brush body 11 is made of the elastic metal material. In the process of injection molding in a metal mold, the connecting body 11-2 made of the elastic metal material and the fiber or the protrusion 11-11 made of the elastic polymer material are formed into a whole to form the brush body 11. In this way, the built-in interdental brush with a composite structure not only ensures the flexibility of the working portion 11-1 of the brush body 11, but also maintains overall elasticity and moderate rigidity of the brush body 11, and has good transitivity of force.

Figure 5:
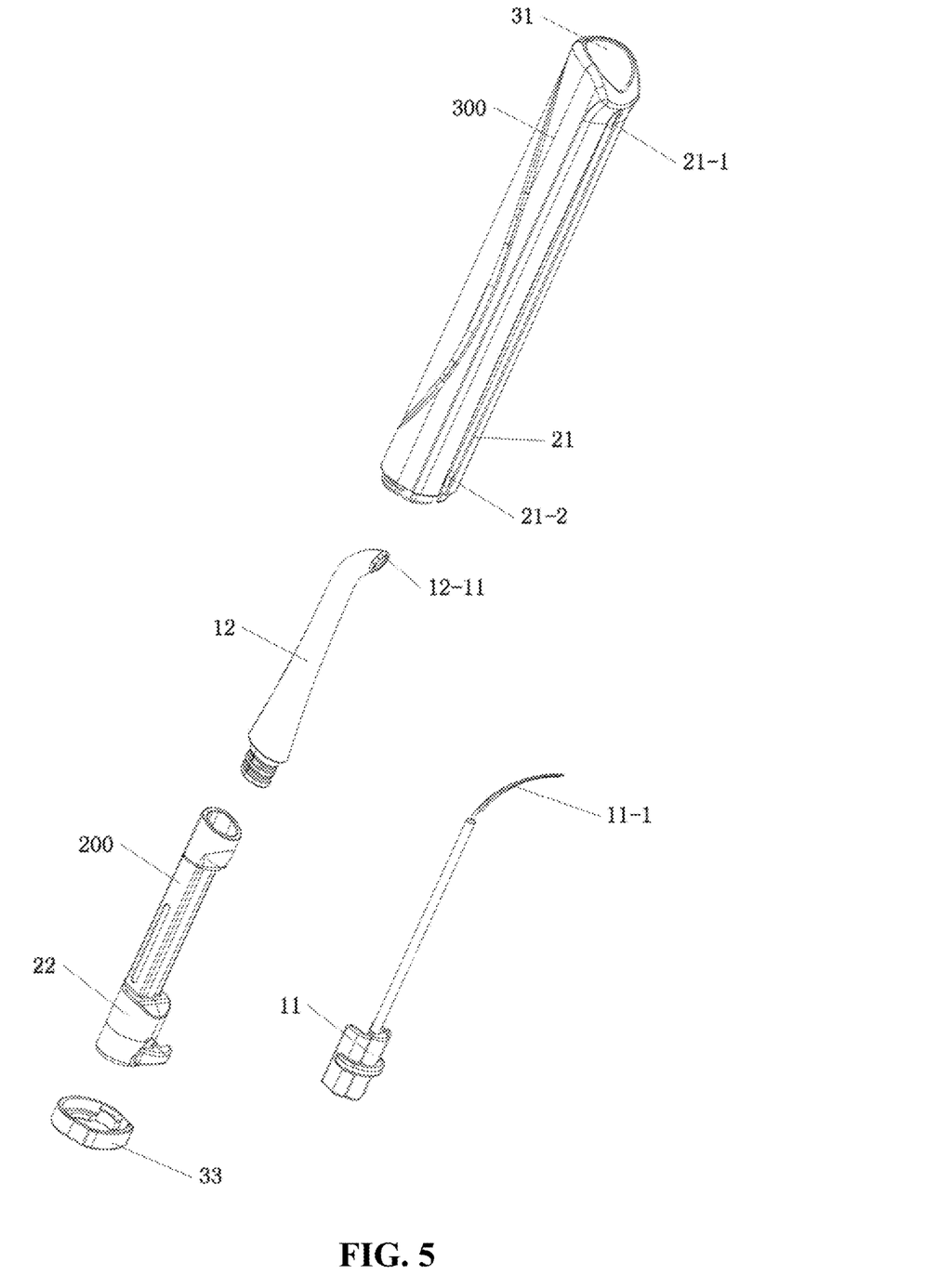
FIG. 5 is an exploded view of a retractable built-in interdental brush of an arc-type built-in interdental brush according to the present application.
Figure 11:
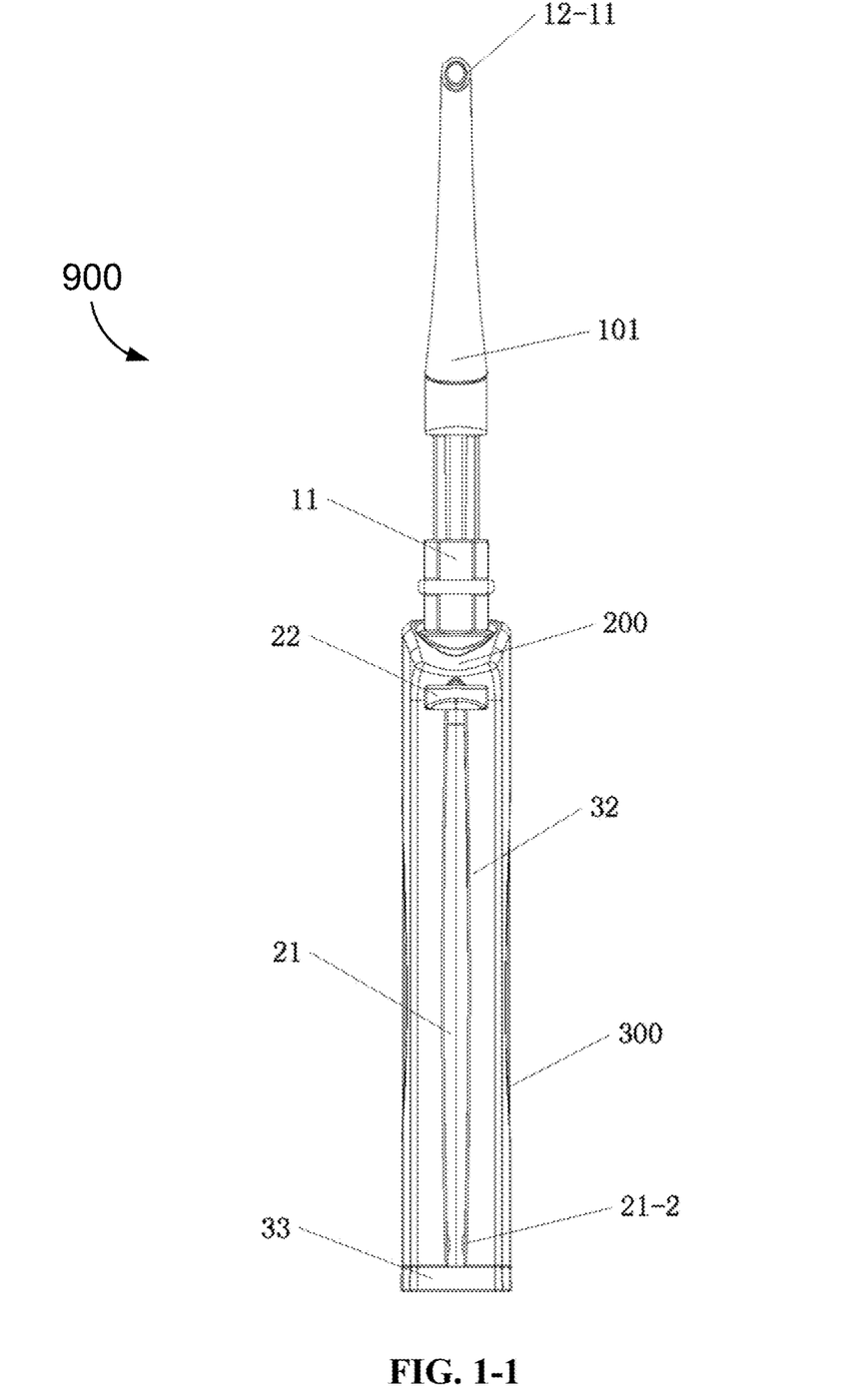

Referring to FIG. 5, the brush body 11 may also be arc-shaped. When the brush body 11 extends from the elbow 12-1, the brush body 11 is in an arc shape, and the arc shape may be designed to be an arc shape similar to that of the outer contour of the tooth.

The brush body 11 may further be made of a shapeable material. For example, the connecting body 11-2 of the brush body 11 is made of a thin steel wire. The connecting body 11-2 of the brush body 11 may be shaped to a certain extent in advance according to the external contour of teeth. After the working portion 11-1 of the brush body 11 extends from the elbow 12-1, the preset shape may be basically maintained.

Definitely, those skilled in the art may further design different types of brush bodies as required, which are not described one by one by using an example by the applicant, and do not depart from the protection scope of this application.

In the present embodiment, the retractable mechanism 200 is a slide-type retractable mechanism. The slide-type retractable mechanism includes a sliding groove 21 and a sliding block 22. The sliding block 22 is pushed to reciprocate along the sliding groove 21, so that the built-in interdental brush 101 extends from or retracts into the handle 300.

The sliding groove 21 is disposed on a housing 32 of the handle 300, and the sliding block 22 is connected to a connecting portion 13 of the built-in interdental brush 101 through a connecting end 22-1, so that the built-in interdental brush 101 and the retractable mechanism 200 can be connected as a whole.

In order to ensure that the built-in interdental brush 101 can be fixed outside the handle 300 after extending from the handle 300, a locking block 21-1 is disposed at an upper end of the sliding groove 21. In order to ensure that the built-in interdental brush 101 can be fixedly accommodated in the handle 300 after being retracted into the handle, a limiting block 21-2 is disposed at a lower end of the sliding groove. When the sliding block 22 is pushed upward, and the sliding block 22 crosses the locking block 21-1, the built-in interdental brush 101 may be fixed outside the handle 300, which can prevent the built-in interdental brush 101 from sliding into the handle 300 during cleaning. When the sliding block 22 is pushed downward, and the sliding block 22 crosses the limiting block 21-2, the built-in interdental brush 101 is fixed in the accommodation space 31 of the handle 300, which can prevent the built-in interdental brush 101 from sliding out of the handle 300 during carrying.

The retractable mechanism 200 may also be a rotation-type retractable mechanism. For example, the built-in interdental brush 101 is pushed from or retracted into the handle 300 by rotating the retractable mechanism 200 by using the movement mode of a threaded screw. Definitely, those skilled in the art may also design the retractable mechanism 200 with different structures as required without departing from the protection scope of this application.

In the present embodiment, the delivery device 12 of the built-in interdental brush 101 is fixedly mounted on the retractable mechanism 200 by bonding through the connecting portion 13, and only the brush body 11 needs to be replaced after cleaning. In this way, the requirement of regular tool replacement and a sanitary requirement for convenience of cleaning is satisfied, and the built-in interdental brush 101 can also be prevented from falling off the retractable mechanism 200 during the cleaning. Therefore, the use process can be very safe.

The built-in interdental brush 101 may further be fixedly connected to the retractable mechanism 200 in various manners such as integral manufacturing, ultrasonic welding, and the like, which are not described one by one by using an example by the applicant, and do not depart from the protection scope of this application.

The built-in interdental brush 101 may also be detachably mounted on the retractable mechanism 200 through concave-convex snap fit connection, threaded connection, or interference fit connection. This facilitates the overall disassembly, cleaning or replacement of the built-in interdental brush 101, which is not described by the applicant by using specific examples herein, and does not depart from the protection scope of this application.

During assembling, a bottom cover 33 of the handle 300 is first removed, the built-in interdental brush 101 is connected to the retractable mechanism 200, the built-in interdental brush 101 and the retractable mechanism 200 are both placed into the accommodation space 31 from the bottom of the handle 300, the sliding block 22 of the retractable mechanism 200 is mounted in the sliding groove 21, and the bottom cover 33 is mounted.

During use, the sliding block 22 is pushed upward to push the built-in interdental brush 101 out of the handle 300. Then the brush body 11 may be first retracted into the elbow 12-1 at the front end of the delivery device 12, the tip at the upper part of the end surface 12-11 of the elbow 12-1 at the front end of the delivery device 12 is pushed against the gap between teeth to be cleaned to push the brush body 11, and the working portion 11-1 of the brush body 11 extends from the elbow 12-1 and enters the gap between teeth, so that the gap between teeth can be cleaned. In this way, the problem that the existing built-in interdental brush easily stabs gingival tissue due to a difficulty of alignment to the gap between teeth may be resolved well. Moreover, the tip can be well embedded in the gap between the teeth, not easy to slip off, and the positioning is very convenient and more stable.

Figure 3:
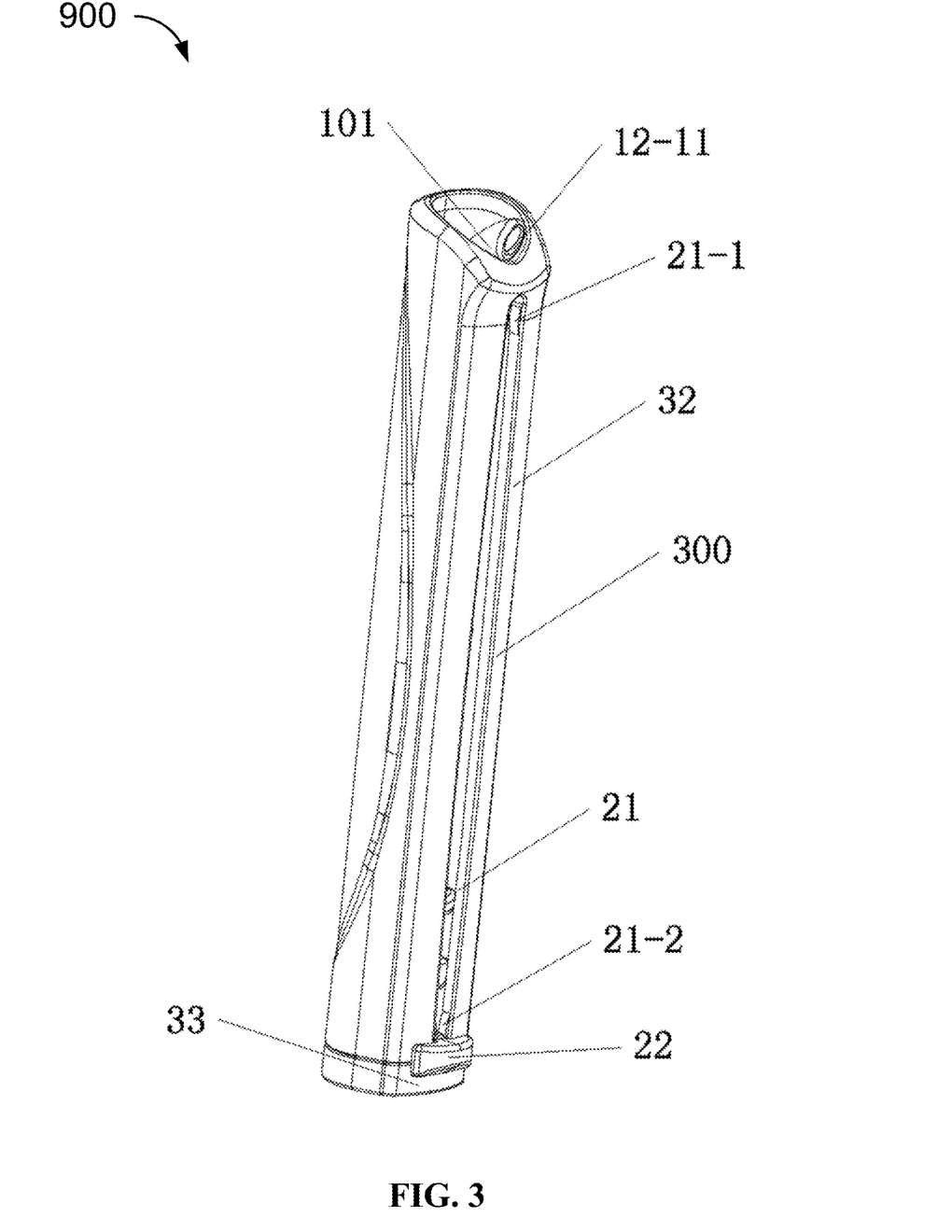
FIG. 3 is a three-dimensional schematic structural diagram of a built-in interdental brush of a retractable built-in interdental brush retracted into a handle according to the present application.
Figure 32:
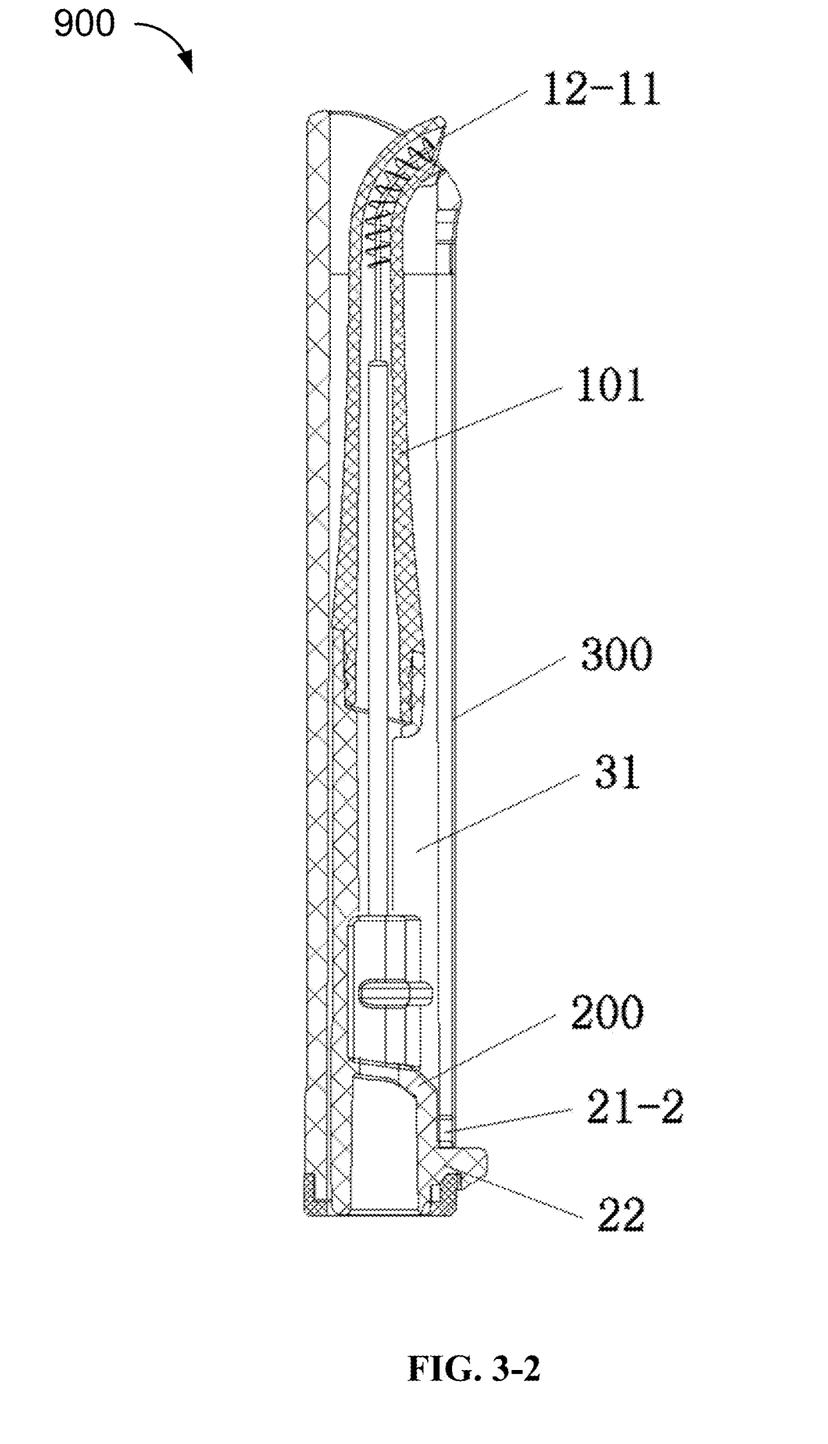

After use, the sliding block 22 is pushed downward to drive the built-in interdental brush 101 to move downward, and the built-in interdental brush 101 is retracted into the accommodation space 31 of the handle 300. The handle 300 may form a compact instrument box, which is very convenient to carry and facilitates accommodation of the built-in interdental brush 101.

Due to the built-in interdental brush, the retractable built-in interdental brush of the present embodiment has many advantages such as convenience and safety in use and convenience for accommodation and carrying.

Especially with the inclined surface design of the end surface 12-11 of the delivery device 12, the end surface 12-11 is tapered during use, and the tip can be well embedded in the gap between the teeth, which can better position the gap between the teeth. The brush body is less likely to slip off when being pushed and pulled, and the positioning is more convenient and stable.

It should be noted that the structure disclosed and described in this specification may be replaced with another structure with the same effect. In addition, the embodiments described in the present application are not the only structure of implementing the present application. Although exemplary embodiments of the present application have been introduced and described in this specification, it should be understood by a person skilled in the art that the embodiments are merely described by way of example, and a person skilled in the art may make various changes, improvements, and replacements without departing from the present application. Therefore, the protection scope of the present application should be defined in accordance with the spirit and scope of the claims appended to the present application.

What is claimed is:

1. A retractable built-in interdental brush, comprising:
   a built-in interdental brush comprising a brush body tip, and a delivery device comprising a connecting portion, hollow passageway, and curved elbow outlet with an inclined end surface;
   a retractable mechanism; and
   a handle comprising an accommodation space;
   wherein the retractable mechanism and the built-in interdental brush are configured to retract into the accommodation space of the handle into a stowed position and the retractable mechanism and the built-in interdental brush are configured to slide out of the accommodation space to an extended operating position;
   when configured in the extended operating position, the delivery device is configured to stow the brush body tip within the hollow passageway in a retracted position and configured to deflect the brush body tip with the curved elbow outlet as the brush body tip is slid along an axial axis of the delivery device to a fully extended position wherein the brush body tip extends from the inclined end surface at an obtuse angle relative to the axial axis;
   wherein the inclined end surface is oriented at an acute angle relative to both the brush body tip in the fully extended position and the axial axis, wherein a distance between a most distal tip of the inclined end surface and the axial axis of the delivery device is larger than a distance between a most proximal point of the inclined end surface and the axial axis of the delivery device;
   wherein during use of the retractable built-in interdental brush:
      the retractable mechanism and the built-in interdental brush are slid out of the accommodation space to the extended operating position;
      the most distal tip of the inclined end surface of the curved elbow outlet is pushed against a gap between teeth of a user and the brush body tip is extended to the fully extended position and enters the gap between the teeth; and
   wherein after use of the retractable built-in interdental brush, the brush body tip is retracted into the delivery device into the retracted position and the retractable mechanism and the built-in interdental brush are retracted into the accommodation space of the handle.

2. The retractable built-in interdental brush according to claim 1, wherein a preferred range of the acute angle is 5° to 50°.

3. The retractable built-in interdental brush according to claim 1, wherein the built-in interdental brush includes a brush body physically coupled to the brush body tip, the brush body is movably located inside the delivery device.

4. The retractable built-in interdental brush according to claim 3, wherein the brush body is made of an elastic material, and the elastic material is selected from an elastic polymer material or an elastic metal material.

5. The retractable built-in interdental brush according to claim 1, wherein the retractable mechanism is a slide-type retractable mechanism or a rotation-type retractable mechanism.

6. The retractable built-in interdental brush according to claim 5, wherein the retractable mechanism is a slide-type retractable mechanism, wherein the slide-type retractable mechanism comprises a sliding groove and a sliding block, wherein the sliding block is pushed to reciprocate along the sliding groove, so that the built-in interdental brush extends from or retracts into the handle.

7. The retractable built-in interdental brush according to claim 1, wherein the built-in interdental brush is detachably mounted on the retractable mechanism.

8. The retractable built-in interdental brush according to claim 7, wherein the built-in interdental brush is connected to the retractable mechanism through concave-convex snap fit connection, threaded connection, or interference fit connection.

9. The retractable built-in interdental brush according to claim 1, wherein the built-in interdental brush is non-detachably mounted on the retractable mechanism.

10. The retractable built-in interdental brush according to claim 9, wherein the built-in interdental brush is connected to the retractable mechanism through bonding or integral manufacturing.

* * * * *